Nov. 14, 1950 — H. R. ASHCRAFT — 2,530,039
PLANT DUSTER
Filed Aug. 26, 1946 — 2 Sheets-Sheet 1

Inventor
HARRY R. ASHCRAFT
By Randolph & Beavers
Attorneys

Nov. 14, 1950     H. R. ASHCRAFT     2,530,039
PLANT DUSTER

Filed Aug. 26, 1946     2 Sheets-Sheet 2

Inventor
HARRY R. ASHCRAFT
By Randolph & Beavers
Attorneys

Patented Nov. 14, 1950

2,530,039

UNITED STATES PATENT OFFICE 2,530,039

PLANT DUSTER

Harry R. Ashcraft, Edgewood, Md.

Application August 26, 1946, Serial No. 693,068

1 Claim. (Cl. 43—147)

This invention relates to apparatus for applying insecticides and other chemicals to plants and various foliage, the principal object being to provide an apparatus for dusting or spraying chemicals including a hood for encompassing a particular plant or area, so that the spraying or dusting operation takes effect within that particular area, and to the end that the chemical cannot be carried away by wind.

Another important object of the invention is to provide a hand sprayer or duster for applying insecticides and other chemicals to plants, which can be readily transported from point to point and actuated in an easy and convenient manner.

Still another object of the invention is to provide an apparatus for treating plants wherein a hood is employed for encompassing a plant or area of foliage and in which dusting or spraying means is provided for delivering the desired treating substance to all parts of the foliage, and where, if some of the treating substance falls from the plant, it will fall immediately upon the surrounding ground and have effect against any insects or vermin which may be on the approach toward attacking the plant.

These and other objects and advantages of the invention will become apparent to the reader of the following description.

In the drawings:

Figure 2 is a horizontal sectional view taken on a line 2—2 of Figure 1.

Figure 3 is a fragmentary horizontal sectional view taken on a line 3—3 of Figure 1.

Figure 1:
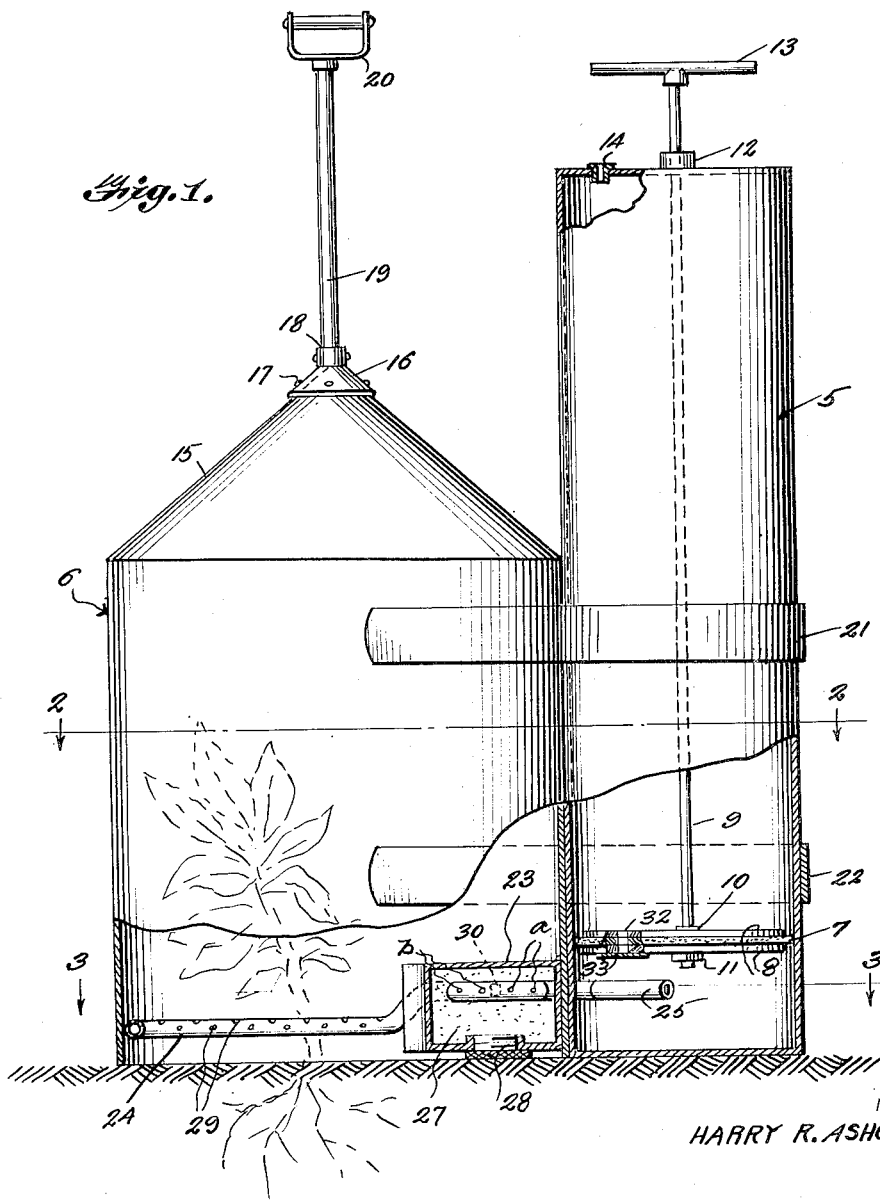
Figure 1 is a side elevational view of the apparatus with portions broken away to disclose internal construction.

Referring to the drawings, the apparatus broadly consists of an air cylinder generally referred to by numeral 5 and a spray hood generally referred to by numeral 6.

The air cylinder 5 has a piston operative therein, this being composed of a flexible disc 7, wiping the inside of the cylinder and being stiffened for its major area on each side by a metal disc 8, there being a rod 9 extending vertically in the cylinder and passing downwardly through the piston, the same having a stop collar or shoulder 10 above the piston and against which the piston abuts and while the lower extremity of the rod is threaded to accommodate a nut 11 driven against the underside of the piston, for holding the piston in position and the parts thereof firmly together.

The upper portion of the piston rod 9 extends through a guide neck 12 at the top of the cylinder and its upper outer end is provided with a handle 13. Numeral 14 denotes a vent plug in the top of the cylinder 5.

The hood 6 is preferably cylindrical and is of such diameter as to encompass the size of plants to be treated. Inasmuch as this is a portable apparatus, there will of course be some limitation on the size of plants to be treated. The top of the film or hood 6 is of conical shape as denoted by numeral 15 and this has a conical cap member 16 at its apex, properly riveted thereto as at 17 and supporting a socket 18 for receiving the lower end of a hand bar 19 which is secured in said socket, the hand bar having a handle 20 at its upper end, whereby the apparatus can be conveniently carried.

Upper and lower straps 21, 22 respectively embrace the cylinder 5 and are welded or otherwise secured to the adjacent side portion of the hood 6.

At the lower portion of the interior of the hood 6 is an arcuate horizontally disposed reservoir 23, the same having the end portions of a loop or spray coil 24 disposed therethrough, these end portions which are denoted by reference numerals 25, 26 also extending through the side portion of the hood 6 adjacent the air cylinder 5 and into the air cylinder 5 to meet with their open ends beneath the piston of said air cylinder. The bottom of the reservoir 23 which is to contain the dusting or spraying chemical, denoted by numeral 27 in Figure 1, has a filler plug 28.

As seen in Figure 3, the spray tube or pipe 24 has perforations 29 therein through which the chemical is sprayed onto a plant or other foliage located within the confines of the hood 6.

The openings 29 are also located in the end portions of the spray pipe extending through the reservoir 23, but each end portion 25, 26 has a closure plug 30 therein which separates certain openings $a$ from openings $b$ in each end portion 25 of the spray pipe, with the result that when air is forced into the pipe ends 25, 26 the air escapes into the reservoir 23 by way of the opening $a$ and this air forces the chemical from the reservoir 23 into the spray pipe 24 by way of the secondary opening $b$.

It can be seen that the spray pipe or loop 24 is located at the lower portion of the interior of the hood 6 and is supported by suitable brackets 31 fastened to the inside of the hood 6.

In the operation and use of this apparatus, the reservoir 23 is stocked with the desired chemical, by way of the opening left by the removal of the plug 28.

The hood 6 is now set as to be over a plant to be treated and the apparatus allowed to rest upon the ground, as shown in Figure 1.

The handle 13 is now grasped and pulled upwardly, elevating the piston and upon the down stroke of the handle and piston, air will be forced through the end portions 25, 26 of the spray pipe 24 and through the openings *a* into the reservoir 23, this air acting to displace some of the chemicals from the reservoir, through the openings *b* into the spray pipe 24 and out through the openings 29. The sprayed chemicals will reach practically all parts of the housed plant and any portions of the substance that may fall off of the foliage will drop on the ground immediately surrounding the plant and effectively kill any pests that may be lurking or on the approach to the plant.

The apparatus is adapted especially for dry chemicals. The piston has an opening 32 which is closed by a flap valve 33 on its down stroke, and opens on its up stroke to prevent suction in the lower part of the cylinder.

Certain parts of the apparatus may be made of wood and other parts of light gauge metal. It is preferable that the apparatus be made of light material so that it can be easily transported manually from point to point. The lightness of material will not affect the operation of the outfit nor affect its efficiency, because there is very slight wear and tear on the structure during operation.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A plant dusting apparatus comprising a plant covering hood, a vertically disposed air cylinder at the side of the hood, means for securing the cylinder to the hood, a plunger rod operating through the top of the cylinder and provided with a piston at its lower end and within the cylinder, a handle at the upper end of the rod and at the outer side of the cylinder, a chemical containing box located on the inside of the hood and secured to the side wall thereof, and an opened loop-shaped pipe extending circumferentially within the hood and having leg portions projecting through the chemical containing box and through the side wall of the hood and into the lower portion of the cylinder, below said piston, said leg portions being open at their free ends and terminating in close proximity to each other, said loop-shaped pipe being formed with openings, said leg portions each having a barrier therein at a point within the confines of the chemical containing box, said leg portions having openings therein at each side of their respective barriers.

HARRY R. ASHCRAFT.

REFERENCES CITED

The following references are of record in the file of this patent:

UNITED STATES PATENTS

| Number | Name | Date |
|---|---|---|
| 263,209 | Palmer | Aug. 22, 1882 |
| 721,535 | Boylan | Feb. 24, 1903 |
| 1,439,980 | Saladiner | Dec. 26, 1922 |
| 1,527,491 | Rose | Feb. 24, 1925 |
| 1,792,804 | Brandt | Feb. 17, 1931 |